(12) United States Patent
Greenwood, III et al.

(10) Patent No.: US 8,965,160 B2
(45) Date of Patent: Feb. 24, 2015

(54) OPTICAL FIBER CABLES

(71) Applicant: Corning Optical Communications LLC, Hickory, NC (US)

(72) Inventors: Julian Latelle Greenwood, III, Hickory, NC (US); Scott Allen McDowell, Connelly Springs, NC (US); Reginald Roberts, Taylorsville, NC (US); David Alan Seddon, Hickory, NC (US)

(73) Assignee: Corning Optical Communications LLC, Hickory, NC (US)

( * ) Notice: Subject to any disclaimer, the term of this patent is extended or adjusted under 35 U.S.C. 154(b) by 0 days.

(21) Appl. No.: 14/336,251

(22) Filed: Jul. 21, 2014

(65) Prior Publication Data

US 2014/0328564 A1    Nov. 6, 2014

Related U.S. Application Data

(63) Continuation of application No. 14/173,274, filed on Feb. 5, 2014, now Pat. No. 8,805,142, which is a continuation of application No. 13/352,773, filed on Jan. 18, 2012, now Pat. No. 8,687,930, which is a continuation of application No. PCT/US2010/043222, filed on Jul. 26, 2010.

(60) Provisional application No. 61/230,452, filed on Jul. 31, 2009.

(51) Int. Cl.
*G02B 6/44*     (2006.01)

(52) U.S. Cl.
CPC .................................. *G02B 6/4403* (2013.01)
USPC ........................................................ 385/109

(58) Field of Classification Search
USPC ........................................................ 385/109
See application file for complete search history.

(56) References Cited

U.S. PATENT DOCUMENTS

| 5,748,823 | A | 5/1998 | Navé | 385/113 |
| 6,259,844 | B1 | 7/2001 | Logan et al. | 385/113 |
| 6,606,436 | B2 | 8/2003 | Logan et al. | 385/113 |
| 6,778,745 | B2 * | 8/2004 | Debban et al. | 385/114 |

(Continued)

FOREIGN PATENT DOCUMENTS

| CN | 2127500 Y | 2/1993 | G02B 6/44 |
| CN | 1455280 A | 11/2003 | G02B 6/44 |

(Continued)

OTHER PUBLICATIONS

Patent Cooperation Treaty International Search Report, Application No. PCT/US2010/043222, Aug. 19, 2011, 5 pages.

(Continued)

*Primary Examiner* — Uyen Chau N Le
*Assistant Examiner* — Hoang Tran

(57) ABSTRACT

Cables have reduced freespace, reduced tube diameters, and reduced strength member diameters. The cables are designed to pass robustness testing such as GR-20 while using smaller amounts of raw materials to produce.

20 Claims, 3 Drawing Sheets

(56) References Cited

U.S. PATENT DOCUMENTS

| | | |
|---|---|---|
| 6,853,783 B2 * | 2/2005 | Chiasson et al. .............. 385/114 |
| 6,970,629 B2 | 11/2005 | Lail et al. ..................... 385/100 |
| 6,993,227 B2 | 1/2006 | Lee et al. ...................... 385/103 |
| 7,706,640 B2 | 4/2010 | Pizzorno et al. ................ 385/12 |
| 2002/0044751 A1 * | 4/2002 | Logan et al. .................. 385/113 |
| 2004/0120663 A1 | 6/2004 | Lail et al. ..................... 385/100 |
| 2004/0156603 A1 | 8/2004 | Schneider et al. ............ 385/102 |
| 2004/0208462 A1 | 10/2004 | Parsons et al. ................ 385/100 |
| 2006/0002668 A1 | 1/2006 | Lail et al. ..................... 385/100 |

FOREIGN PATENT DOCUMENTS

| | | | |
|---|---|---|---|
| CN | 201281773 Y | 7/2009 | ............... G02B 6/44 |
| EP | 1286195 A2 | 2/2003 | ............... G02B 6/44 |

OTHER PUBLICATIONS

Australian Patent Examination Report No. 1, Application No. 2010276527, Mar. 10, 2014, 3 pages.

Chinese Search Report, Chinese Application No. 2010800388604, Dated Mar. 6, 2013, 2 pages.

* cited by examiner

OPTICAL FIBER CABLES

PRIORITY APPLICATION

This Application is a continuation of U.S. application Ser. No. 14/173,274, filed on Feb. 5, 2014, which is a continuation of U.S. application Ser. No. 13/352,773, filed Jan. 18, 2012, which issued on Apr. 1, 2014 as U.S. Pat. No. 8,687,930, and which is a continuation of International Application No. PCT/US2010/043222, filed Jul. 26, 2010, which claims priority to U.S. Provisional Application No. 61/230,452, filed Jul. 31, 2009, the content of each of which is relied upon and incorporated herein by reference in its entirety, and the benefit of priority under 35 U.S.C. §120 is hereby claimed.

TECHNICAL FIELD

The present disclosure relates to optical cables having reduced material costs while maintaining desired performance characteristics.

BACKGROUND

Fiber optic cables utilize optical fibers to transmit signals such as voice, video and/or data information. Where fiber optic cables are subjected to forces, the optical fibers may be stressed and attenuation of the transmitted light may result. Industry standards address generic mechanical and optical performance requirements for fiber optic cables to ensure attenuation losses are within acceptable ranges. One such standard is the Generic Requirements for Optical Fiber and Optical Fiber standard GR-20. One way to ensure compliance with GR-20 and other standards is to increase the bulk of the cable, such as by increasing cable diameter, jacket thickness, etc. These measures, however, increase the cost of the cable. It is therefore important for fiber optic cables to be constructed in a robust manner so as to satisfy industry standards while maintaining costs within competitive ranges.

SUMMARY

According to a first embodiment, a cable comprises a cable jacket, a buffer tube defining a cable interior, a plurality of optical fibers in the interior, and strength members embedded in the cable jacket. The optical fibers can be arranged, for example, as a ribbon stack. The cable jacket can be extruded onto the exterior of the buffer tube, and both the cable jacket and the buffer tube can be constructed wholly or partly from polymer materials.

According to one aspect of the first embodiment, the ribbon stack freespace can be lower than that of conventional cables. Cables according to the present embodiments with reduced ribbon stack freespace can show minimal attenuation response and lower material costs.

According to another aspect of the first embodiment, the strength member height on either side of the cable can be relatively close to the buffer tube inside diameter to facilitate access to the cable interior. The strength member height can be, for example, within 1 mm of the buffer tube inside diameter.

According to yet another aspect of the first embodiment, jacket size and strength member size can be smaller than comparable conventional cables in order to reduce material costs.

According to yet another aspect of the first embodiment, the ratio of the product of elastic modulus E and total cross-sectional area A (EA) for the fibers in the ribbon stack to the product of elastic modulus E and total cross-sectional area A of the strength members is higher than in conventional designs at various fiber counts.

It is to be understood that both the foregoing general description and the following detailed description present embodiments of the invention, and are intended to provide an overview or framework for understanding the nature and character of the invention as it is claimed.

BRIEF DESCRIPTION OF THE FIGURES

The present embodiments are explained in more detail below with reference to figures which show the exemplary embodiments.

DETAILED DESCRIPTION

Figure 1:
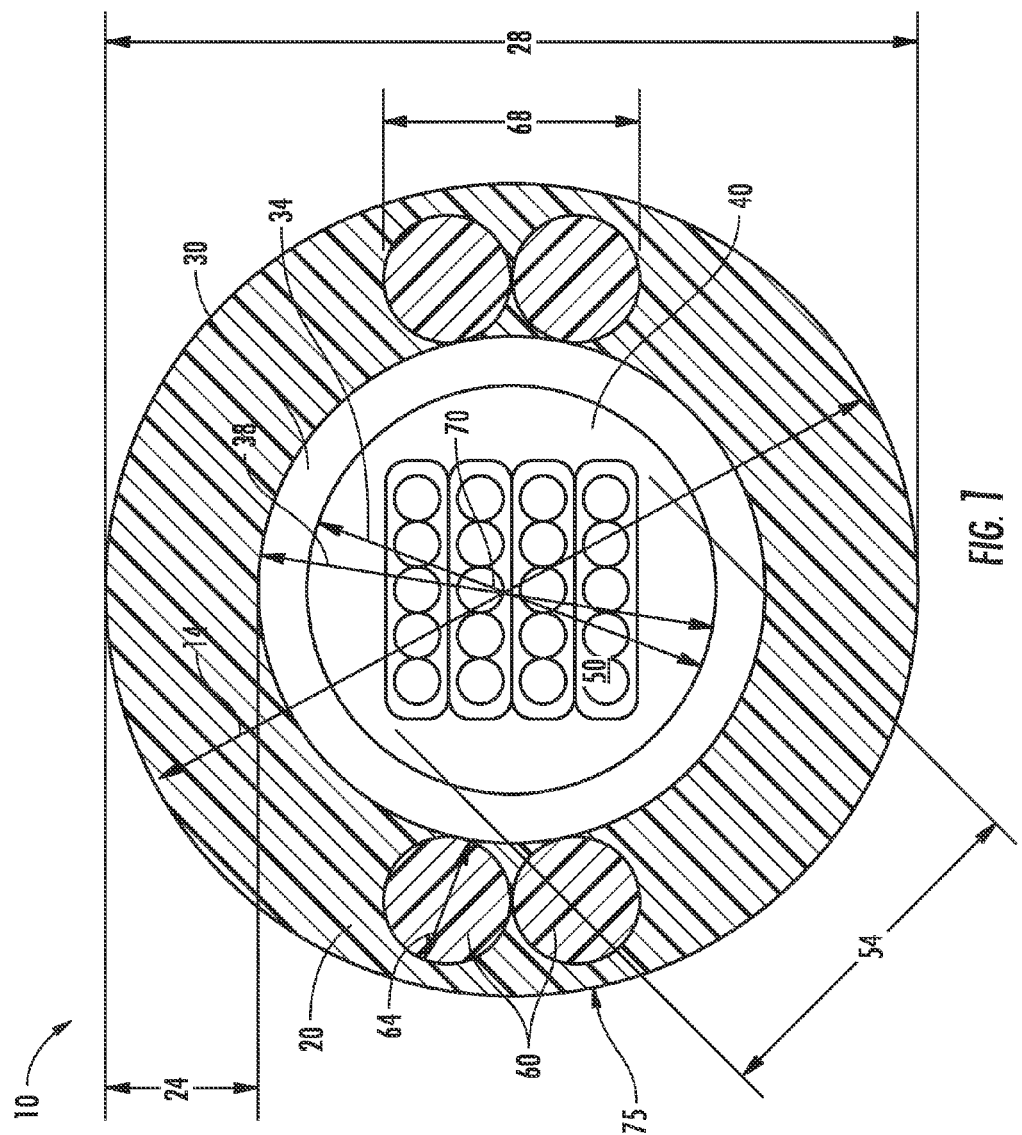
FIG. 1 is a cross section of a cable according to a first embodiment.

FIG. 1 is a cross section of a micromodule cable 10 according to a first embodiment and having an outer diameter 14. The optical cable 10 comprises a jacket 20 having a wall thickness 24 and an outside diameter 28 (also corresponding to the cable 10 diameter). The jacket 20 surrounds and contacts the outer surface of a buffer tube 30 having an inner diameter 34 and an outer diameter 38. The jacket 20 can be formed from, for example, a polymer material such as polyethylene. The buffer tube 30 defines an interior 40 of the cable 10. The cable interior 40 accommodates a plurality of optical waveguides 50. In the illustrated embodiment, the optical waveguides 50 are arranged as a stack of fiber optic ribbons with a ribbon stack diagonal dimension 54. Pairs of strength members 60 are arranged on opposite sides of the cable 10 cross section. The strength members 60 are wholly or substantially embedded in the cable jacket 20, and may be adjacent to and/or abut the buffer tube 30. In the illustrated embodiment, the strength members 60 are circular in cross-section with diameter 64 and with a strength member height 68 for each pair. The jacket 20, the buffer tube 30, the ribbon stack 50, and the strength members 60 can all extend longitudinally along the entire or substantially all of the length of the cable 10.

According to one aspect of the present embodiment, the ribbon stack freespace can be lower than that of conventional cables. Referring to FIG. 1, "ribbon stack freespace" is generally defined as the difference between the buffer tube 30 inside diameter 34 and the ribbon stack major dimension—in this case diagonal 54. In conventional cables, the ribbon stack freespace has historically been above 2.0 mm, with some designs having a freespace as high as 3.38 mm. According to one aspect of the present embodiments, the ribbon stack freespace can be less than 1.5 mm, and more particularly less than 1.0 mm. In one embodiment, the cable 10 is a 48 fiber, 4.1 mm tube inner diameter 34 cable with a ribbon stack freespace of 0.71 mm. Cables according to the present embodiment with reduced freespace can show minimal attenuation response, especially when incorporating bend-improved fibers in the ribbon stack 50. The ribbon stack 50 is free to move radially with respect to a center line 70 of the cable 10, so the spacing between the buffer tube 30 in general will not be constant with respect to any of the corners of the ribbon stack 50.

According to another aspect of the present embodiment, the strength member height 68 can be relatively close to the buffer tube outside diameter 38 in order facilitate access to the cable interior 40. For example, in one embodiment, the strength member height 68 is 3.2 mm, with each strength member 60 having a diameter of 1.60 mm, and the buffer tube inner diameter 34 is 4.1 mm. The difference between strength member height 68 and buffer tube inner diameter 34 can be relatively small—in the range of 1.3 mm or less, or more particularly in the range of 1.0 mm or less. Using the strength members 60 as a blade guide, the cable jacket 10 and buffer tube 30 may be shaved away from the cable 10 without damaging the ribbons in the stack 50. Six strength members 60 of 1.25 mm diameter, for example, with three members on each side of the buffer tube 30, would further decrease the difference between the buffer tube outer diameter 38 and the strength member height 68. Also, if this feature is desired in the field, strength members 60 can be spaced or separated (in the vertical direction in FIG. 1) in order to increase the overall strength member height 68. In the illustrated embodiment, the strength members 60 are dielectric rigid/semi-rigid strength members, and can be glass-reinforced plastic (GRP) rods with circular cross-sections, although other materials (e.g. steel) and/or cross-sections can be used. Referring to FIG. 1, the "strength member height" is defined as the spacing between the outermost edges (shown as the uppermost and lowest edges in FIG. 1) of the outermost strength members on one side of the cable. In the illustrated embodiment, the strength members 60 abut one another so the strength member height 68 is the sum of the diameters of the strength members 60 on each side of the cable 10. It is generally preferable that the strength members 60 abut the buffer tube 30 to prevent jacket material from coming between the strength members 60 and the buffer tube 30.

According to another aspect of the present embodiment, by reducing the strength member diameter 64, the jacket thickness 24 can also be reduced. For example, a 0.55 mm reduction in strength member diameter 64 was achieved for the cable 10 when compared with a conventional design. This corresponds to the same jacket thickness 24 reduction in the thick portions (or, portions not overlying the strength members 60) of the jacket 20. Similar conventional cable arrangements require at least a 2.80 mm jacket wall to meet minimum jacket thickness requirements. Minimum jacket thickness is the thickness of the jacket required over the strength members 60, indicated generally by the arrow 75 in FIG. 1. The cable 10 in the illustrated embodiment has a jacket 20 of about 2.30 mm thickness. The relatively thin jacket 20 significantly reduces material costs for the cable 10. In an alternative embodiment, a cable having six 1.25 mm diameter strength members 60—three strength members on each side—reduces the jacket thickness even further to 2.00 mm. Cables according to the present embodiments can be constructed to maintain a substantially round outer diameter while retaining the required minimum jacket thickness. The jacket thickness 24 can be, for example, in the range of 2.00 mm to 2.80 mm, or more particularly in the range of 2.30 mm to 2.80 mm.

Figure 2:
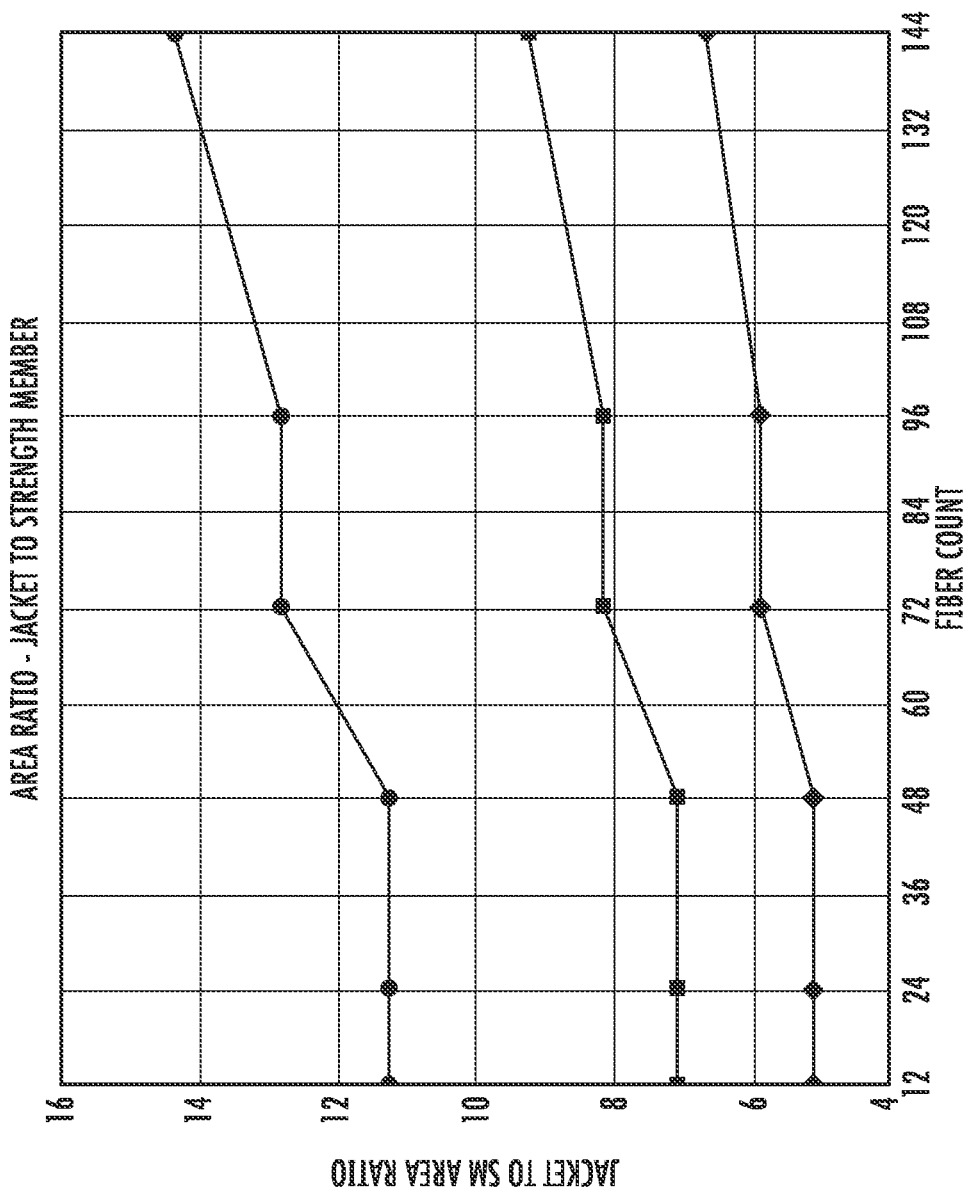
FIG. 2 is a plot of the ratio of jacket area to strength member area for the cable of FIG. 1.

Another way to characterize the relationship between the jacket 20 and the strength members 60 is to compare the cross-sectional area of the jacket 20 with that of the strength members 60. Jacket to strength member area ratio data are tabulated in FIG. 2 for cables at room temperature. When using strength members 60 of round cross-section, the thickness of the jacket 20 is determined by the diameter of the strength members 60 plus the minimum jacket thickness 75 required over the strength members 60. In the illustrated embodiment, the strength member diameter 64 is 1.60 mm, with two strength members 60 on each side of the jacket 20. The minimum jacket thickness 75 is in the range of 0.7-1.0 mm. Reducing the size of the strength members 60 allows a reduction in jacket size, which reduces the costs of material for the cable. In this specification, the term "strength member area" refers to the sum of the cross-sectional areas of all of the strength members in the jacket, and the term "jacket area" refers to the total cross-sectional area for the jacket material. Referring to FIG. 2, the conventional design (the lowest data points on the plot, indicated by diamond data points), has lower jacket area to strength member area ratios for various fiber counts. Data describing the cable 10 illustrated in FIG. 1 correspond to the intermediate values on the plot, and are indicated by square data points. For a cable 10 as shown in FIG. 1, with two 1.60 mm diameter strength members on each side of the cable, the ratio for 12-48 fiber count cables lies in the range of 6-8. For 48-72 fiber cables, the ratio lies in the range of 7-9. For 72-96 fiber cables, the ratio lies in the range of 7.5-9.5. For 96-144 fiber cables, the ratio lies in the range of 8-10.

Jacket area can be further reduced by using only two strength members, of 2.05 mm diameter, one on each side of the jacket 20. In FIG. 2, data describing this cable correspond to the highest values on the plot, and are indicated by round data points. For this embodiment, the jacket to strength member ratio for 12-48 fiber count cables lies in the range of 10-12. For 48-72 fiber cables, the ratio lies in the range of 11-13. For 72-96 fiber cables, the ratio lies in the range of 12-14. For 96-144 fiber cables, the ratio lies in the range of 12-15.

Figure 3:
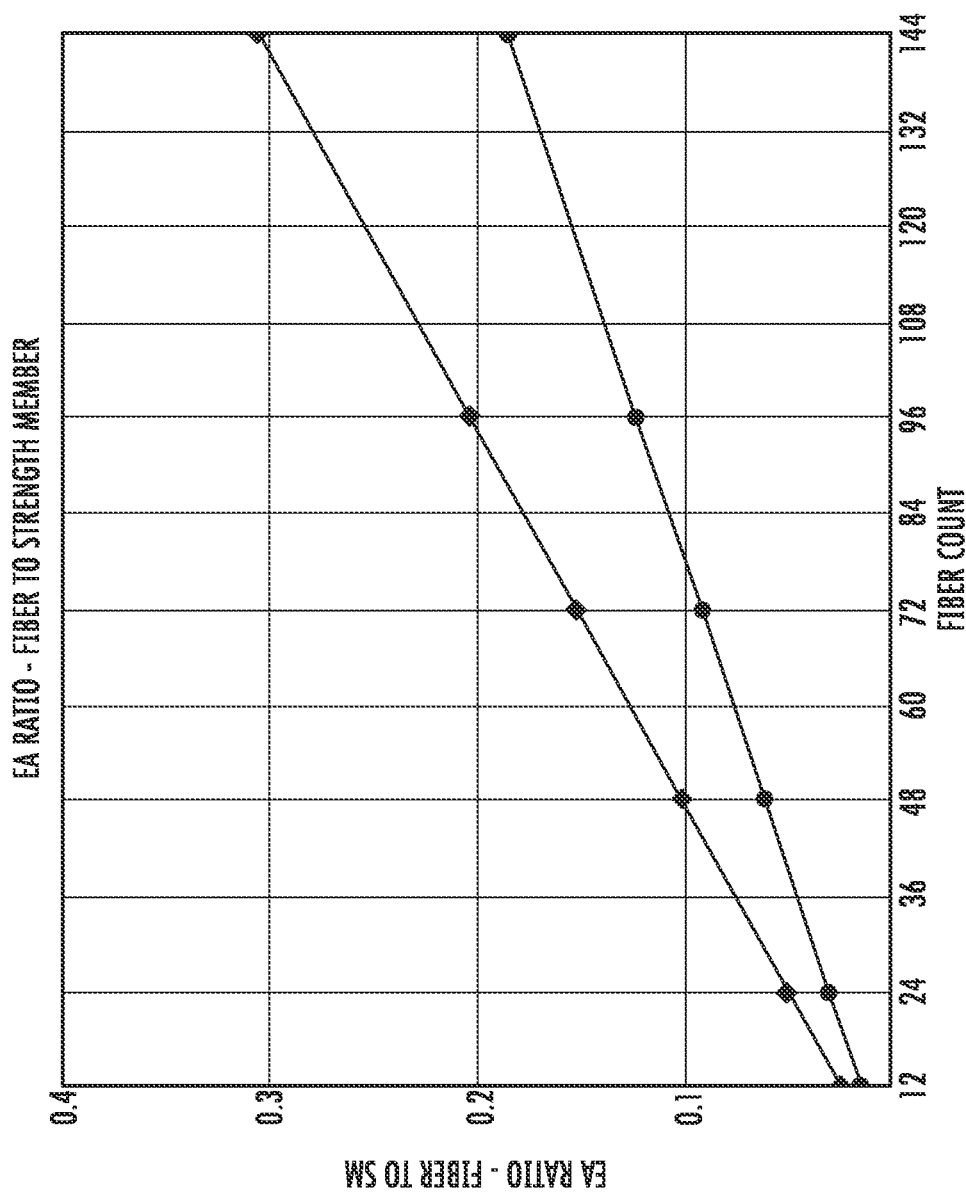
FIG. 3 is a plot of the ration of fiber EA to strength member EA for the cable of FIG. 1.

According to another aspect of the present embodiment, the ratio of the product of elastic modulus E and total area A (EA) for the fibers in the ribbon stack 50 and the strength members 60 is higher than in conventional designs. In this specification, the term "fiber area" refers to the sum of the cross-sectional areas of all of the optical fibers in the cable, including the fiber coatings, and, for ribbonized fibers, includes the total cross-sectional area of the fibers plus coatings in the fiber ribbons. The term "ribbon stack fiber area" could also be used to describe the total cross-sectional area of the optical fibers plus coatings in the fiber ribbons. FIG. 3 is a plot of fiber area multiplied by fiber elastic modulus (or, "fiber EA") divided by the strength member EA. The fiber elastic modulus E is typically calculated to include the fiber and coating(s) applied thereto. In FIG. 3, data showing the ratio of fiber EA to strength member EA for the cable 10 illustrated in FIG. 1 is indicated by diamond data points, while data for a conventional cable is indicated by round data points. According to one embodiment, the ratio of fiber EA (or "ribbon stack EA" for ribbonized fibers) to strength member EA is at least 0.0015× fiber count. In the illustrated embodiment, the ratio is about 0.0021× fiber count. Common matrix material used to cover multiple fibers in a fiber optic ribbon has a relatively low elastic modulus and is not used to calculate ribbon stack fiber area or ribbon stack EA.

The interior 40 of the cable 10 can be filled with a filling compound such as, for example, a waterblocking material such as thixotropic gel or grease. Gel-free designs with or without foam tapes can also be used.

It is understood in this specification that values for jacket thickness 24, cable diameter 28, buffer tube inside diameter 34 and outside diameter 38, ribbon stack diagonal 54, strength member diameter 64, strength member height 68, etc. may vary to some degree according to manufacturing tolerances. The values in this specification may therefore be considered to be averages for a typical cross-section of the cable. The cross-sections in the cable may not necessarily be perfect geometric shapes; for example, the illustrated circular cross-sections may have some degree of ovality in the manufactured cable. Diameter values may therefore be considered to the average diameter of a cross-section at any point along the length of the cable.

The cable 10 can be constructed of materials similar to Single-Tube Ribbon (SST-Ribbon™) Cables available from Corning Cable Systems, Inc. of Hickory N.C. The cable 10 can include one or more ripcords (not illustrated). An armored version of the cable 10 can include metallic or dielectric armor coatings.

The present cable embodiments may utilize tensile yarns as tension relief elements that provide tensile strength to the cables. A preferred material for the tensile yarns is aramid (e.g., KEVLAR®), but other tensile strength materials could be used. For example, high molecular weight polyethylenes such as SPECTRA® fiber and DYNEEMA® fiber, Teijin Twaron® aramids, fiberglass, etc. may also be used. The yarns may be stranded to improve cable performance.

Many modifications and other embodiments of the present invention, within the scope of the claims will be apparent to those skilled in the art. For instance, the concepts of the present invention can be used with any suitable fiber optic cable design and/or method of manufacture. For instance, the embodiments shown can include other suitable cable components such as an armor layer, coupling elements, different cross-sectional shapes, or the like. Thus, it is intended that this invention covers these modifications and embodiments as well those also apparent to those skilled in the art.

What is claimed is:

1. A cable, comprising:
a polymeric cable jacket, the polymeric cable jacket having a jacket area in cross-section;
a polymeric buffer tube within the polymeric cable jacket, the polymeric buffer tube defining an interior thereof;
a plurality of optical fibers arranged as a ribbon stack and located in the interior defined by the polymeric buffer tube, wherein the plurality of optical fibers is more specifically between 12 to 48 optical fibers; and
strength members at least partially embedded in the polymeric cable jacket and positioned on opposing sides of the polymeric cable jacket from one another, the strength members having a strength member area in cross-section, wherein the ratio of the jacket area to the strength member area is in the range of 6 to 8,
wherein the ribbon stack has a ribbon stack fiber area in cross-section, wherein the strength members have a strength member elastic modulus and the ribbon stack has a ribbon stack fiber elastic modulus, wherein a product of the strength member area and the strength member elastic modulus is a strength member EA and a product of the ribbon stack fiber area and the ribbon stack fiber elastic modulus is a ribbon stack EA, and wherein the ratio of the ribbon stack EA to the strength member EA is at least 0.0015 times the number of optical fibers in the ribbon stack.

2. The cable of claim 1, wherein the strength members include a first set of strength members on one side of the polymeric cable jacket and a second set of strength members on the opposing side of the polymeric cable jacket to the one side.

3. The cable of claim 1, wherein the strength members have a strength member height defined as the distance between the outermost edges of outermost strength members on the one side of the polymeric cable jacket, and wherein the strength member height is within 1.3 millimeters (mm) of an inner diameter of the polymeric buffer tube.

4. The cable of claim 1, wherein a thickness of the polymeric cable jacket is in the range of 2.30 to 2.80 mm.

5. The cable of claim 1, wherein the ribbon stack is located in the interior of the polymeric buffer tube such that the ribbon stack has a freespace of less than 1.5 mm.

6. A cable, comprising:
a polymeric cable jacket, the polymeric cable jacket having a jacket area in cross-section;
a polymeric buffer tube within the polymeric cable jacket, the polymeric buffer tube defining an interior thereof;
a plurality of optical fibers arranged as a ribbon stack and located in the interior defined by the polymeric buffer tube, wherein the plurality of optical fibers is more specifically between 48 to 72 optical fibers; and
strength members at least partially embedded in the polymeric cable jacket and positioned on opposing sides of the polymeric cable jacket from one another, the strength members having a strength member area in cross-section, wherein the ratio of the jacket area to the strength member area is in the range of 7 to 9,
wherein the ribbon stack has a ribbon stack fiber area in cross-section, wherein the strength members have a strength member elastic modulus and the ribbon stack has a ribbon stack fiber elastic modulus, wherein a product of the strength member area and the strength member elastic modulus is a strength member EA and a product of the ribbon stack fiber area and the ribbon stack fiber elastic modulus is a ribbon stack EA, and wherein the ratio of the ribbon stack EA to the strength member EA is at least 0.0015 times the number of optical fibers in the ribbon stack.

7. The cable of claim 6, wherein the strength members include a first set of strength members on one side of the polymeric cable jacket and a second set of strength members on the opposing side of the polymeric cable jacket to the one side.

8. The cable of claim 6, wherein the strength members have a strength member height defined as the distance between the outermost edges of outermost strength members on the one side of the polymeric cable jacket, and wherein the strength member height is within 1.3 mm of an inner diameter of the polymeric buffer tube.

9. The cable of claim 6, wherein a thickness of the polymeric cable jacket is in the range of 2.30 to 2.80 mm.

10. The cable of claim 6, wherein the ribbon stack is located in the interior of the polymeric buffer tube such that the ribbon stack has a freespace of less than 1.5 mm.

11. A cable, comprising:
a polymeric cable jacket, the polymeric cable jacket having a jacket area in cross-section;
a polymeric buffer tube within the polymeric cable jacket, the polymeric buffer tube defining an interior thereof;
a plurality of optical fibers arranged as a ribbon stack and located in the interior defined the polymeric buffer tube, wherein the plurality of optical fibers is more specifically between 72 to 96 optical fibers; and
strength members at least partially embedded in the polymeric cable jacket and positioned on opposing sides of the polymeric cable jacket from one another, the strength members having a strength member area in cross-section, wherein the ratio of the jacket area to the strength member area is in the range of 7.5 to 9.5,
wherein the ribbon stack has a ribbon stack fiber area in cross-section, wherein the strength members have a strength member elastic modulus and the ribbon stack has a ribbon stack fiber elastic modulus, wherein a product of the strength member area and the strength member elastic modulus is a strength member EA and a product of the ribbon stack fiber area and the ribbon stack fiber elastic modulus is a ribbon stack EA, and wherein the ratio of the ribbon stack EA to the strength member EA is at least 0.0015 times the number of optical fibers in the ribbon stack.

12. The cable of claim 11, wherein the strength members include a first set of strength members on the one side of the polymeric cable jacket and a second set of strength members on the opposing side of the polymeric cable jacket to the one side.

13. The cable of claim 11, wherein the strength members have a strength member height defined as the distance between the outermost edges of outermost strength members on the one side of the polymeric cable jacket, and wherein the strength member height is within 1.3 mm of an inner diameter of the polymeric buffer tube.

14. The cable of claim 11, wherein a thickness of the polymeric cable jacket is in the range of 2.30 to 2.80 mm.

15. The cable of claim 11, wherein the ribbon stack is located in the interior of the polymeric buffer tube such that the ribbon stack has a freespace of less than 1.5 mm.

16. A cable, comprising:
a polymeric cable jacket, the polymeric cable jacket having a jacket area in cross-section;
a polymeric buffer tube within the polymeric cable jacket, the polymeric buffer tube defining an interior thereof;
a plurality of optical fibers arranged as a ribbon stack and located in the interior defined the polymeric buffer tube, wherein the plurality of optical fibers is more specifically between 96 to 144 optical fibers; and
strength members at least partially embedded in the polymeric cable jacket and positioned on opposing sides of the polymeric cable jacket from one another, the strength members having a strength member area in cross-section, wherein the ratio of the jacket area to the strength member area is in the range of 8 to 10,
wherein the ribbon stack has a ribbon stack fiber area in cross-section, wherein the strength members have a strength member elastic modulus and the ribbon stack has a ribbon stack fiber elastic modulus, wherein a product of the strength member area and the strength member elastic modulus is a strength member EA and a product of the ribbon stack fiber area and the ribbon stack fiber elastic modulus is a ribbon stack EA, and wherein the ratio of the ribbon stack EA to the strength member EA is at least 0.0015 times the number of optical fibers in the ribbon stack.

17. The cable of claim 16, wherein the strength members include a first set of strength members on the one side of the polymeric cable jacket and a second set of strength members on the opposing side of the polymeric cable jacket to the one side.

18. The cable of claim 16, wherein the strength members have a strength member height defined as the distance between the outermost edges of outermost strength members on the one side of the polymeric cable jacket, and wherein the strength member height is within 1.3 mm of an inner diameter of the polymeric buffer tube.

19. The cable of claim 16, wherein a thickness of the polymeric cable jacket is in the range of 2.30 to 2.80 mm.

20. The cable of claim 16, wherein the ribbon stack is located in the interior of the polymeric buffer tube such that the ribbon stack has a freespace of less than 1.5 mm.

* * * * *